(12) United States Patent
Bauchot

(10) Patent No.: US 7,971,134 B2
(45) Date of Patent: Jun. 28, 2011

(54) METHOD AND SYSTEM IN AN ELECTRONIC SPREADSHEET FOR PERSISTENTLY FILLING BY SAMPLES A RANGE OF CELLS

(75) Inventor: Frederic Bauchot, Saint Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 3365 days.

(21) Appl. No.: 09/995,266

(22) Filed: Nov. 27, 2001

(65) Prior Publication Data

US 2002/0103825 A1  Aug. 1, 2002

(51) Int. Cl.
*G06F 17/00* (2006.01)
(52) U.S. Cl. .................. 715/219; 715/212; 715/215
(58) Field of Classification Search .................. 715/503, 715/504, 219, 212, 215
See application file for complete search history.

(56) References Cited

U.S. PATENT DOCUMENTS

| | | | | |
|---|---|---|---|---|
| 5,121,499 A * | 6/1992 | McCaskill et al. | ............ | 715/503 |
| 6,263,379 B1 * | 7/2001 | Atkinson et al. | ............ | 719/332 |
| 6,750,864 B1 * | 6/2004 | Anwar | ............ | 345/440 |

OTHER PUBLICATIONS

Flaherty, John, "Selected Excel Basics, Excel Tips for Efficient Spreadsheet Use", Available: http://www.bf.rmit.edu.au/quant/Excel/Excel_Tips.pdf.*
EXCEL97 Book, Chapter 4: Entering and Editing Data, Available at: http://libdata.itc.gu.edu.au/lap/XL97BOOK/Excel-04.htm, 1997.*
"Introduction to Microsoft Excel 97", Academic Technology Support, California State University, Los Angeles, 1997.*
Conlon, Rhonda, "Filling a Range with Sequential Data", Copyright 1997, North Dakota State University Agriculture Communication Department, XP002347860, at: http://web.archive.org/web/20000901081243/http://www.lgta.org/123/14.data.htm.*
Screen Shots from Microsoft Excel 2000, Copyright 1985-1999, Microsoft Corporation.*
Screen Shots from Microsoft Excel 2000, Copyright 1985-1999, Microsoft Corporation., pp. 1-10.*
Rhonda Conlon, "Filling a Range with Sequential Data", Sep. 2000, North Dakota State University Agrigulture Communication Dept., XP002347860, URL: http://web.archive.org/web/20000901081243/; http://222.1gta.org/123/14.data.htm.
D. McRitchie, "Fill in the Empty Cells", Nov. 25, 2000, XP002347861, URL: http://www.mvps.org/dmcritchie/excel/fillempt.htm.
P. Lutus, "Some Useful Excel 7.0 Spreadsheets", 1996, XP002347862, URL: http:www.archnoid.com/lutusp/excel.html.

* cited by examiner

*Primary Examiner* — Laurie Ries
(74) *Attorney, Agent, or Firm* — Schmeiser, Olsen & Watts; John Pivnichny

(57) ABSTRACT

A method of filling empty cells of a range of cells in a spreadsheet on the basis of sample values contained in a sub-set of the range.

20 Claims, 14 Drawing Sheets

| Index | sample | Xi | Index of previous sample | Xprev. sample | f(Xprev. sample) | Index of next sample | Xnext sample | f(Xnext sample) | Color |
|---|---|---|---|---|---|---|---|---|---|
| | | | | | 401 | | | | |
| 402 | 403 | 404 | 405 | 406 | 407 | 408 | 409 | 410 | 411 |
| | | | | | | | | | |

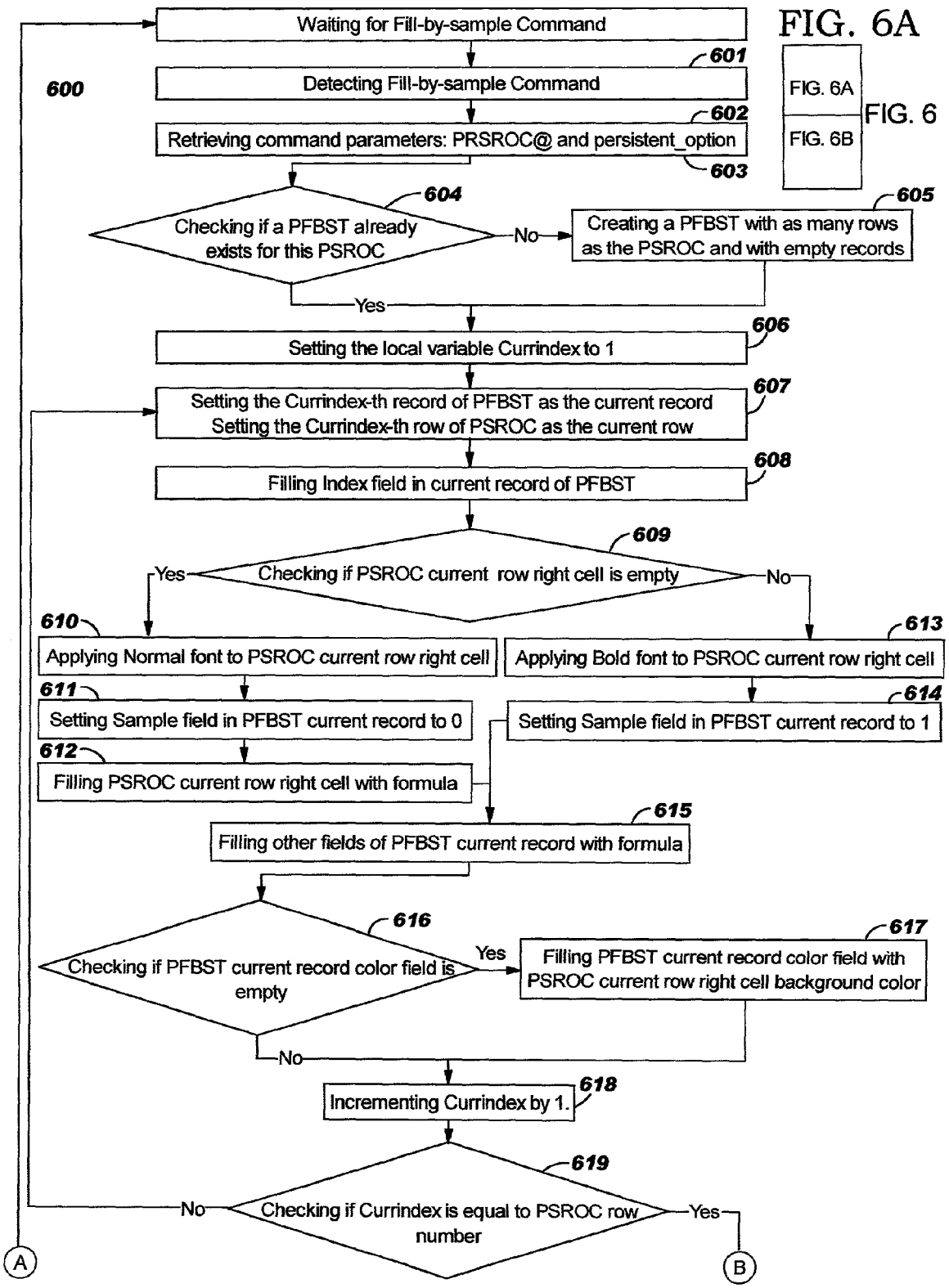

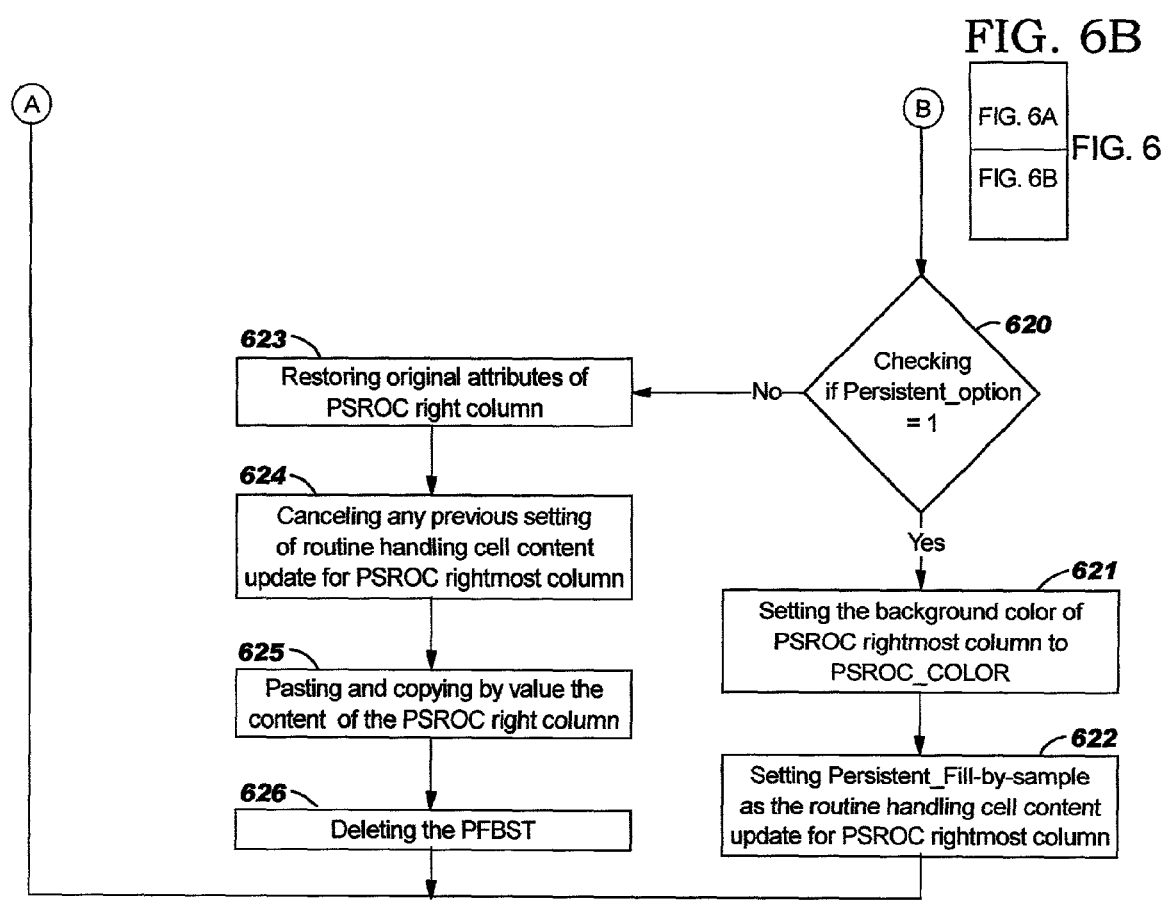

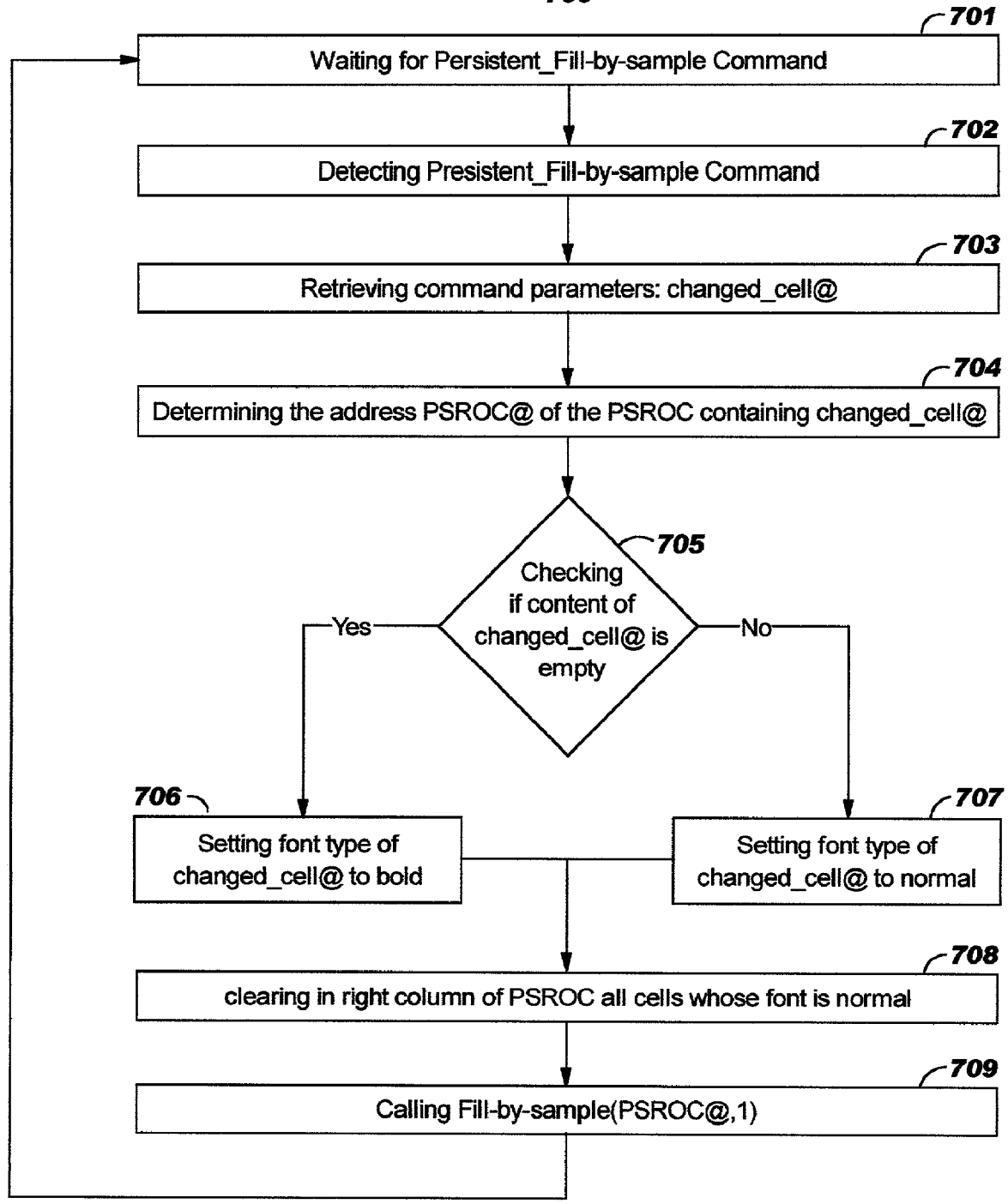

METHOD AND SYSTEM IN AN ELECTRONIC SPREADSHEET FOR PERSISTENTLY FILLING BY SAMPLES A RANGE OF CELLS

TECHNICAL FIELD OF THE INVENTION

The present invention relates to the field of information processing by digital computers, and more particularly to a method and system, in an electronic spreadsheet, for filling a range of cells on the basis of sample values found within this same range of cells, with the option to turn this operation as persistent.

BACKGROUND ART

Before computers, numerical analyses, particularly financial ones, were usually prepared on an accountant's columnar pad or paper spreadsheet, with pencil and calculator in hand. By organising data into columns and rows, such spreadsheets assist the assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerised replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range of cells as long as they are arranged as a rectangle or cube set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

Cell ranges are used to automate computations in spreadsheets. Whether cells or cell ranges are named or not, they can be referenced within a formula either by a "relative" or an "absolute" reference. Such a reference can be the address of the referenced cell range, or the name of the referenced cell range if it turns that this cell range is named.

It is common to find in electronic spreadsheet based applications some two-dimensional (2D) or three-dimensional (3D) tables which are defined as ranges of cells and which record the values of a function of the form $y=f(x)$, or $z=f(x, y)$. Without losing any generality, the rest of our description will assume a 2D table with associated relationships of the form $y=f(x)$. The values taken by such functions can either follow a theoretical model or represent some experimental measures. In the former case, the cell will typically be filled with a formula representing the theoretical relationship between the input variable (the x parameter) and the output variable (the y parameter). In the later case some cells within the range of cells will contain values corresponding to samples obtained by experimentation, whereas the remaining cells within the range are left empty. Keeping such void cells is generally a problem because these cells, if used as parameters within formulas or functions, lead to ERR cells. It is thus desirable to fill these empty cells with some values. Conventional spreadsheet tools offer some means for that, but with some severe limitations as outlined hereafter. When a range of cells is selected, conventional electronic spreadsheet applications (like Excel from Microsoft Corporation or like 1-2-3 from Lotus Corporation) allow to fill the range in different ways, according to options and parameters that can be specified in menus, sub-menus or dialog boxes.

The conventional range filling means assume that the values within the selected range of cells follow either a linear or exponential law. This may address some specific spreadsheet user needs, but it is generally very constraining to try to approximate any function with only a linear or exponential law.

When the filling function is not explicitly specified by the user, the conventional range filling means determine it on the basis of the two first cells found in the selected range. If these two first cells do not hold values, then the range filling operation has no effect on the selected range. If these two first cells do hold values, then the range filling operation will update the content of all the other cells of the range, even if they previously contained some information. Thus some information may be inadvertently lost.

When a range of cells has been already filled, for instance on the basis of the two first cells, any subsequent change in the value of one of these two first cells does not affect the values taken by all the other cells within the range of cells. This lack of flexibility necessitates a re-run of the range filling operation on the same range of cells.

The conventional range filling means generally assumes that the values found in the cells of the range correspond to the transformation of an arithmetic sequence of values. In other words, the i-th cell of the range is equal to f(i) where f is either a linear or exponential function: $f(i)=a*i+b$ or $f(i)=a*b^i$.

From the previous points, it is clear that the range filling means available in conventional electronic spreadsheet presents severe limitations which may easily result in false calculations or loss of information. The present invention offers a powerful and efficient solution to this problem by defining a method and a system for filling a range of cells on the basis of a sub-set of "sample" values, with the possibility of persistently and automatically reacting to sample value change or sample value introduction or sample value deletion.

SUMMARY OF THE INVENTION

The present invention is directed to a method for filling empty cells of a range of cells on the basis of sample values contained in a sub-set of the range of cells, in a multi-dimensional spreadsheet comprising a plurality of cells identified by a cell address along each dimension, a range of cells comprising a plurality of cells. The method comprises the steps of:

selecting a range of cells, the range of cells comprising a plurality of cells, the plurality of cells comprising a plurality of sample cells and one or a plurality of empty cells, a sample cell containing a sample value, an empty cell containing no value or a value not considered as a sample value; the content $y_i$ of each sample cell and each empty cell being associated with a particular value $x_i$ of a variable x;

activating a fill-by-sample operation, said fill-by-sample operation comprising the steps of:

ordering the sample cells and the empty cells according to the values $x_i$ associated with the content of these cells;

and for each empty cell, the steps of:

identifying the value $x_i$ associated with the content of the empty cell;

selecting one or a plurality of previous sample cells;

selecting one or a plurality of next sample cells;

computing the value $y_i$ of the empty cell according to the values $y_{previous}$ contained in the selected one or plurality of previous sample cells, and the values $y_{next}$ contained in the selected one or plurality of next sample cells;

filing the empty cell with the computed value $y_i$.

Further embodiments of the invention are provided in the appended dependent claims.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 4 illustrates the structure of a persistent fill-by-sample table, according to the preferred embodiment of the present invention.

FIGS. 6A and 6B, arranged according to FIG. 6, is a flow chart illustrating a preferred method for performing, upon a spreadsheet user request, a (potentially persistent) fill-by-sample operation on a range on cells, according to the present invention.

FIG. 7 is a flow chart illustrating a preferred method for automatically performing a persistent_fill-by-sample operation on a range of cells, upon detection of the change of the content of a cell within this range of cells.

DETAILED DESCRIPTION OF THE PREFERRED EMBODIMENT

System Hardware

Figure 1A:
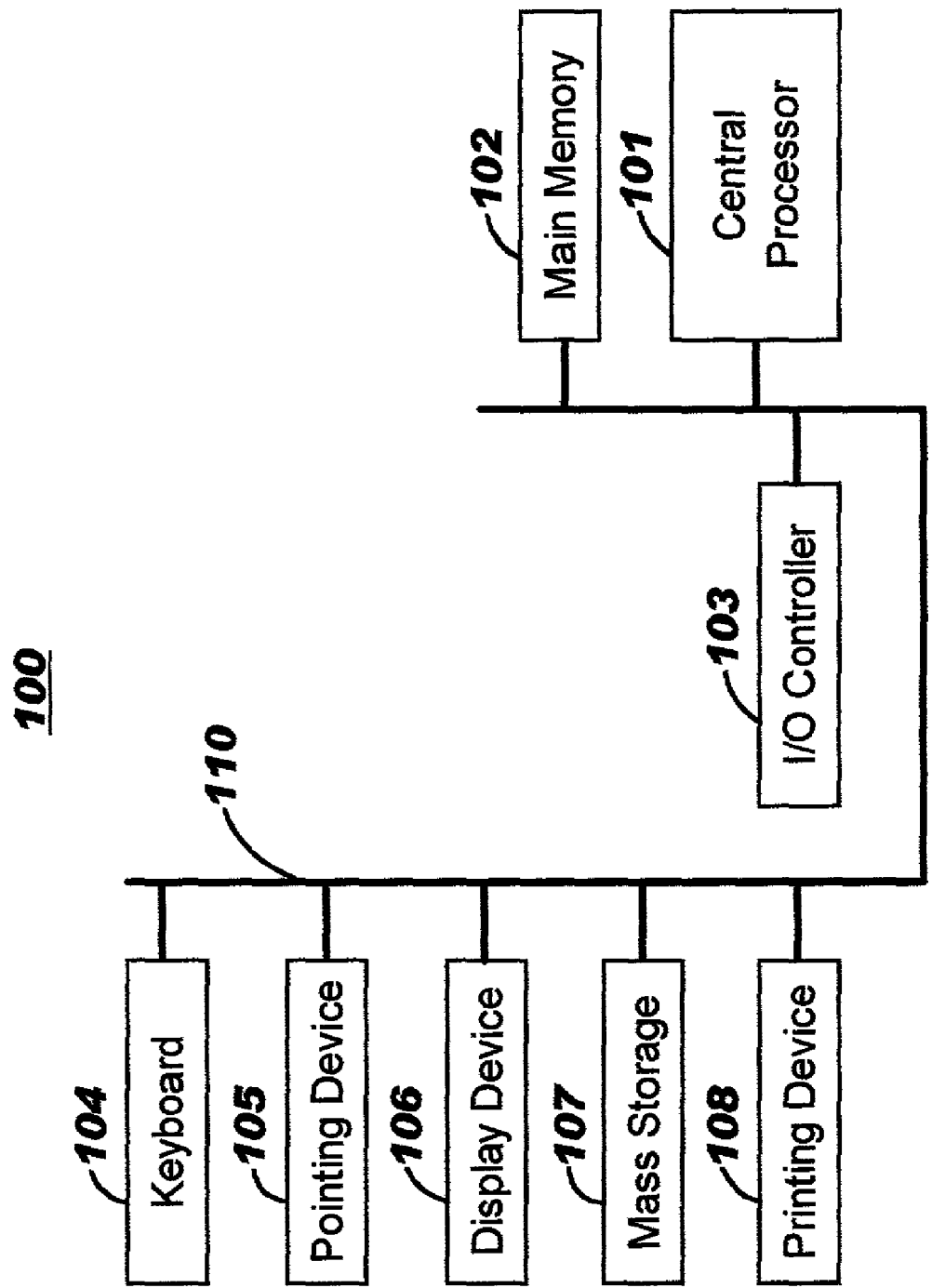
FIG. 1A is a schematic view of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Figure 1B:
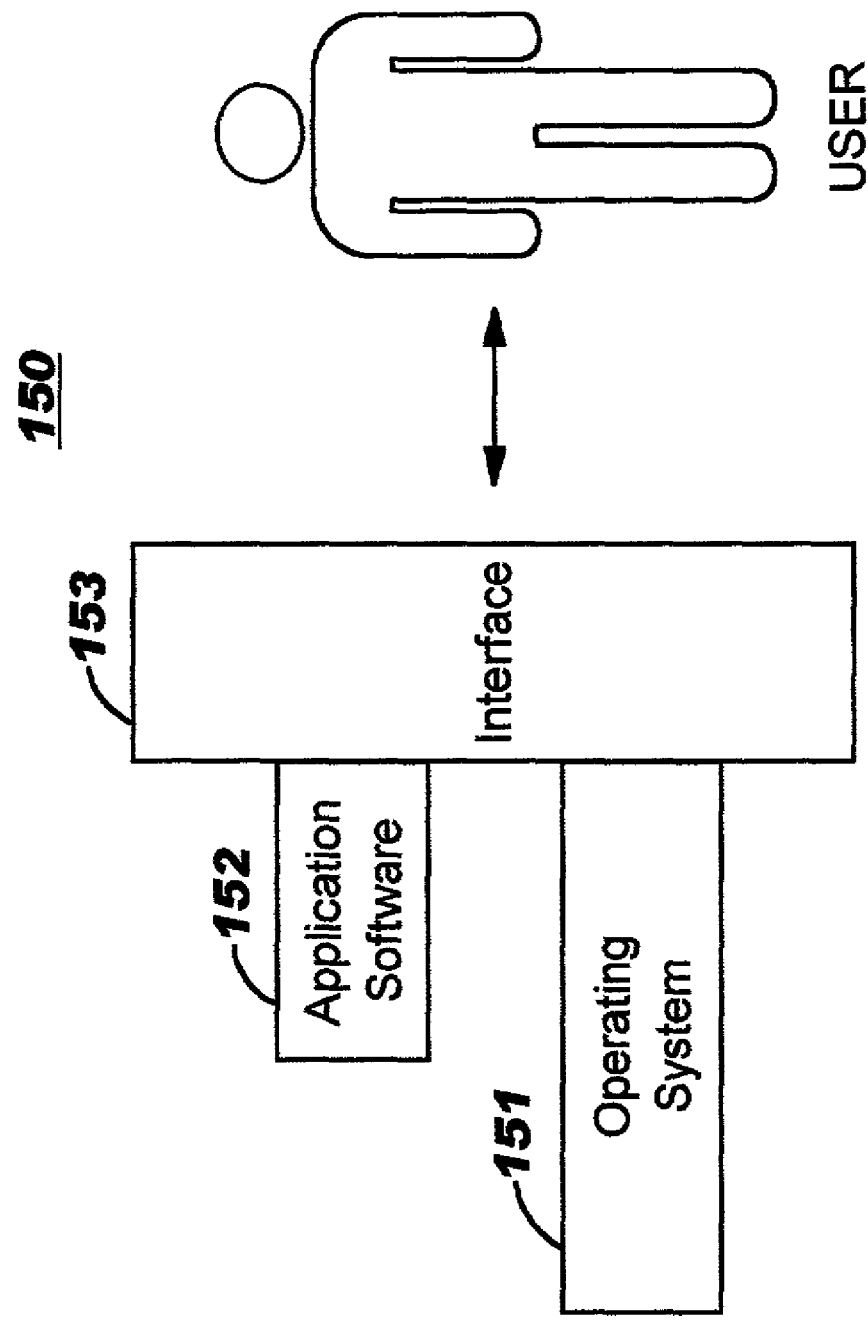
FIG. 1B is a schematic view a software system including an operating system, an application software, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating system 151 and/or application software 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application software 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments that follows is for purposes of illustration and not limitation.

Figure 1C:
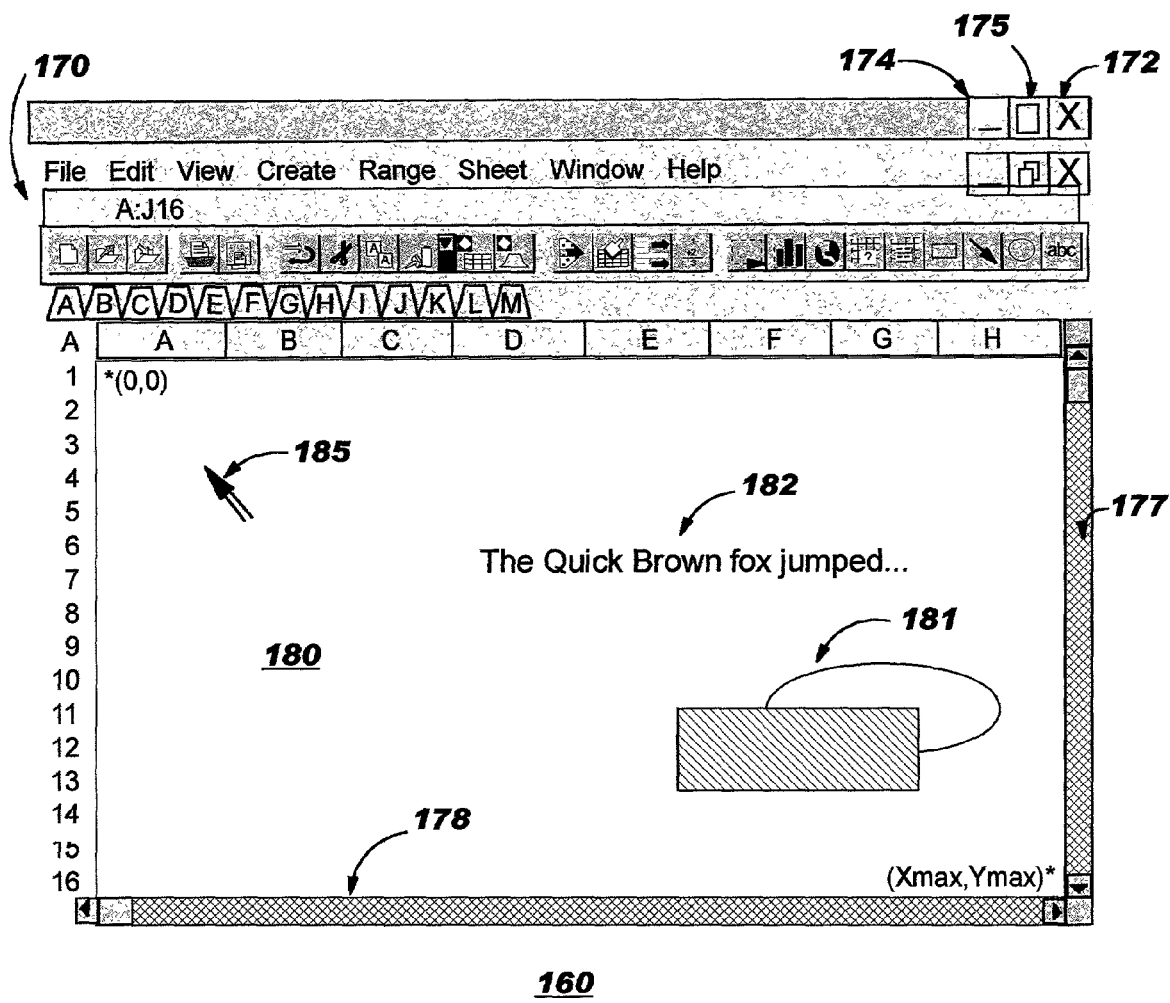
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects residing within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/175, and 177/178, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Preferred Interface

Figure 2A:
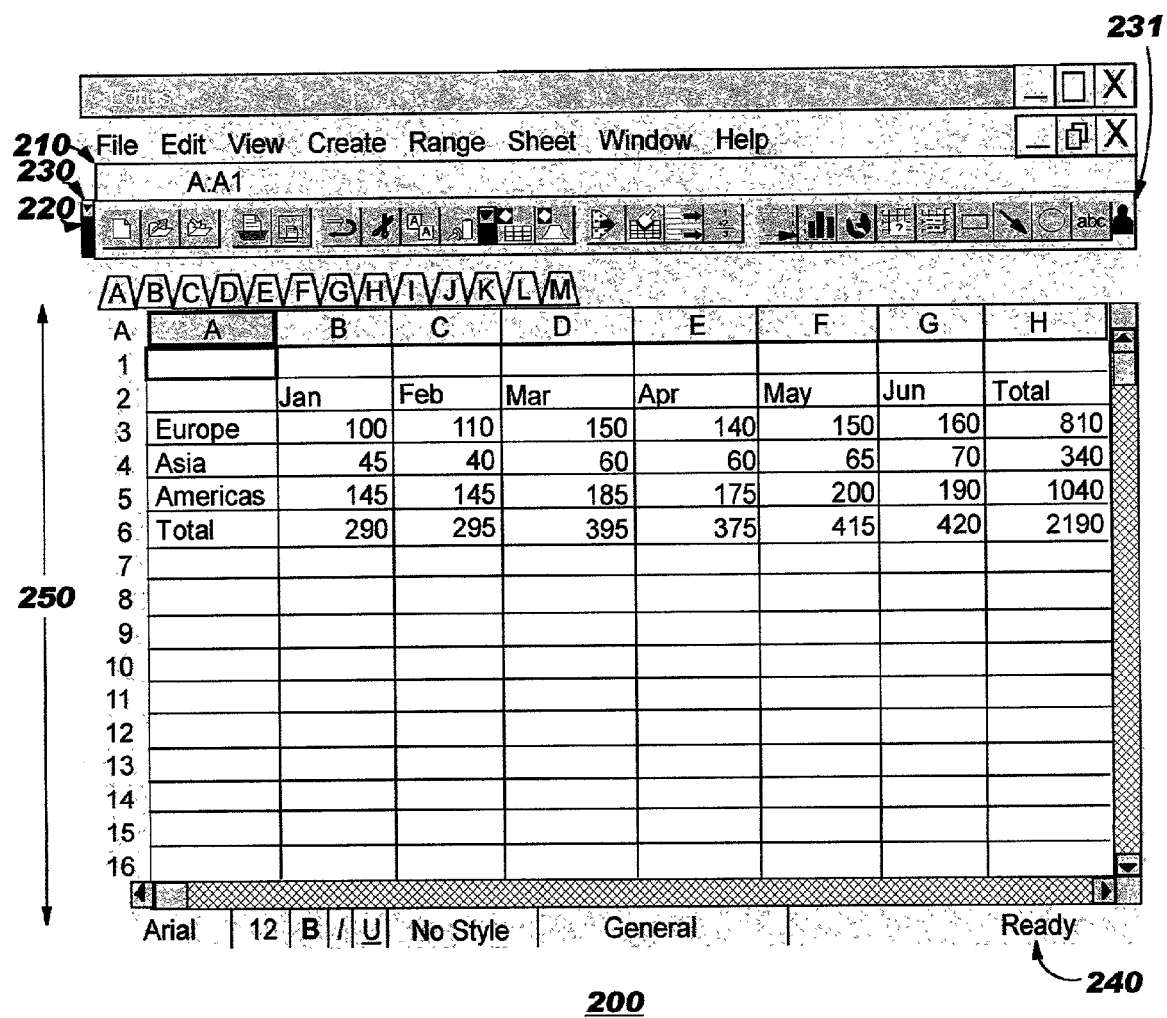
FIG. 2A shows a spreadsheet notebook interface according to the preferred embodiment of the present invention.

Shown in FIG. 2A, a spreadsheet notebook interface of the present invention will now be described. The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
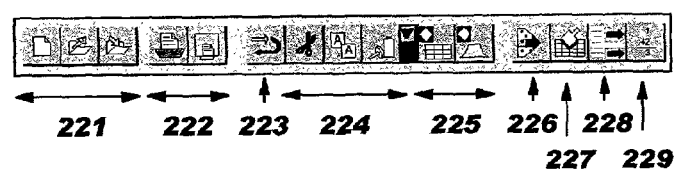
FIG. 2B shows the toolbar component of the notebook interface shown in FIG. 2A.

The toolbar 220, shown in further detail in FIG. 2B, comprises a row or palette of tools that provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column resizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2D spreadsheet. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
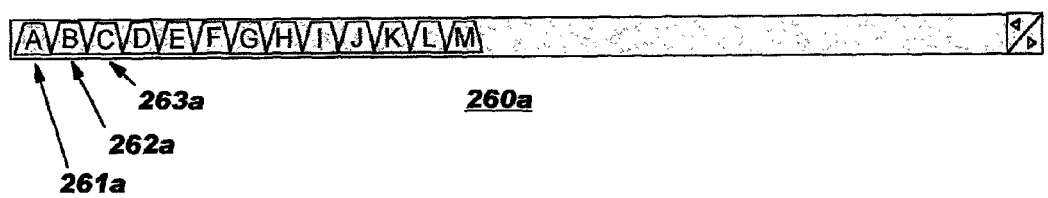
FIGS. 2C and 2D show page identifiers for rapidly accessing and manipulating individual pages of the notebook interface shown in FIG. 2A.
Figure 2D:
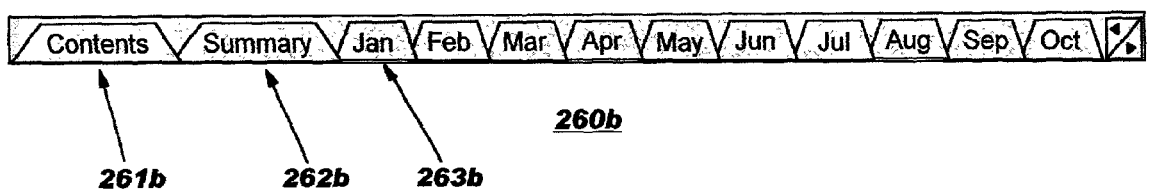

As shown in FIGS. 2C-2D, individual notebook pages are identified by page identifiers 260, preferably located along one edge of a notebook. In a preferred embodiment, each page identifier is in the form of a tab member (e.g., members 261*a*, 262*a*, 263*a*) situated along a top edge of the notebook. Each tab member may include representative indicia, such as textual or graphic labels, including user-selected titles representing the contents of a corresponding page. In FIG. 2C, the tab members 260 are set to their respective default names. For example, the first three tab members (members 261*a*, 262*a*, 263*a*) are respectively set to A, B, and C. Tab members are typically given descriptive names provided by the user, however. As shown in FIG. 2D, for example, the first three tab members have now been set to "Contents" (tab member 261*b*), "Summary" (tab member 262*b*), and "Jan" (tab member 263*b*). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Persistent Fill-By-Sample Operation

A. Introduction

Figure 3A:
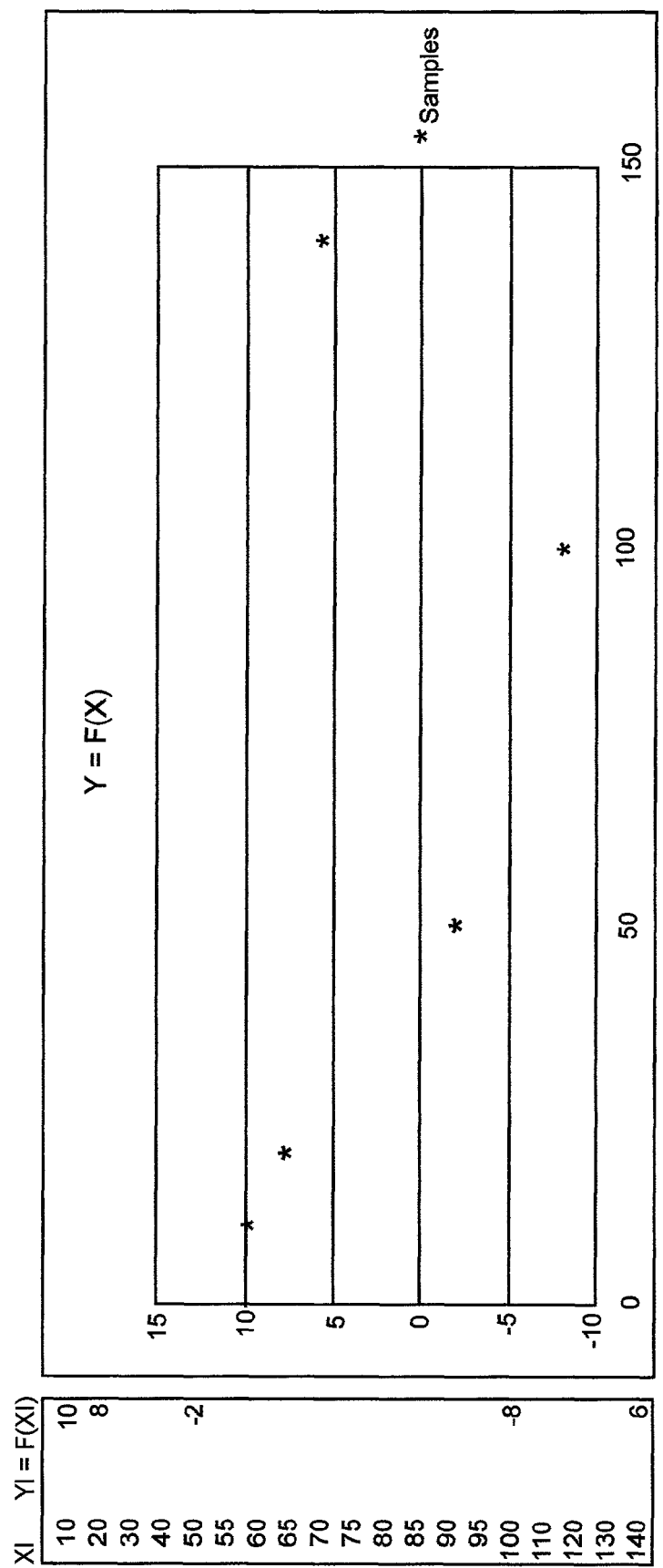
FIGS. 3A, 3B, 3C, 3D use a specific example to compare the effect of a conventional range filling operation with the effect of a fill-by-sample operation, according to the preferred embodiment of the present invention.
Figure 3B:
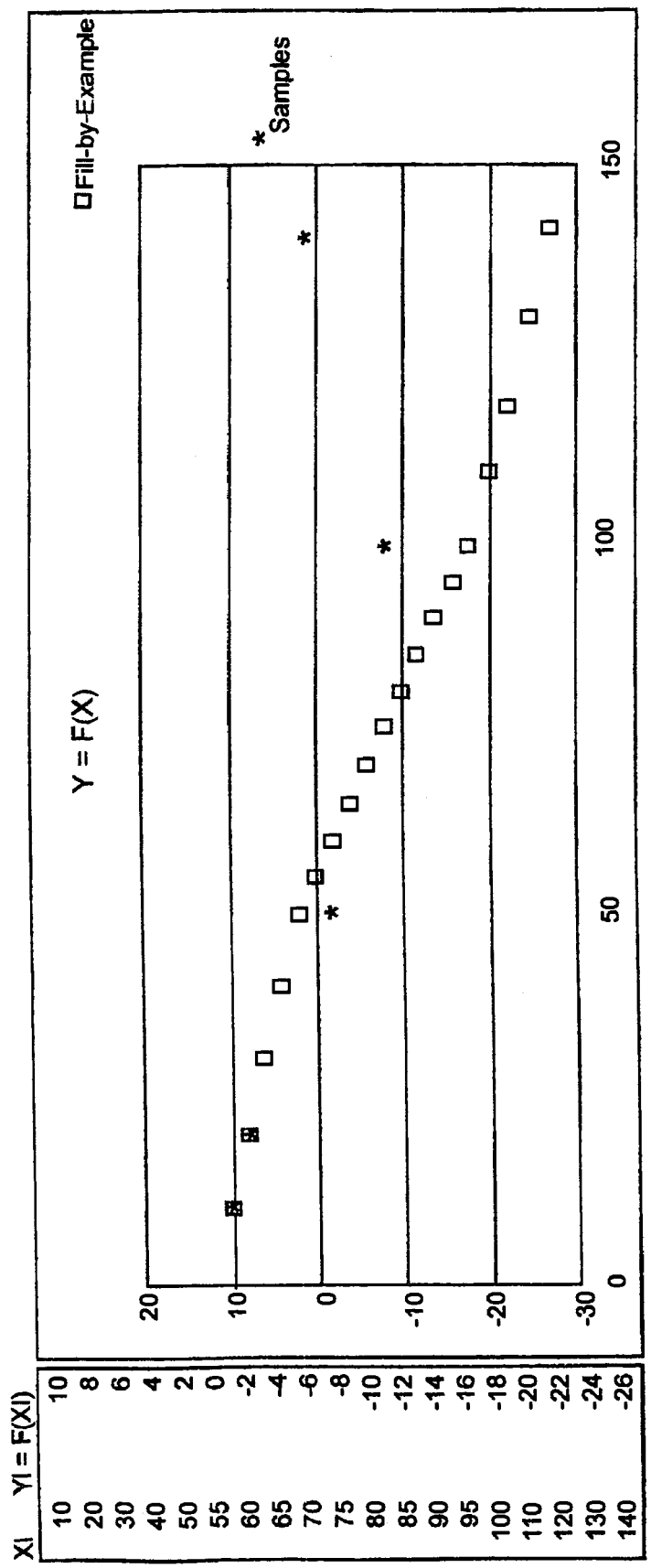

As the power of spreadsheet environments has increased, it is today possible to develop complex custom applications solely based on spreadsheets, as opposed to applications developed with general purpose programming languages like C++ or VisualBasic from Microsoft Corporation. This can be achieved thanks to the spreadsheet imbedded tools such as ranges of cells, macro languages, script languages and formulas. In large spreadsheets, it is common to find structured tables where the content of some cells belonging to a sub-set of the structured table, is filled with information (the "values") derived from experimentation samples and where other cells not belonging to this same sub-set of the structured table (because the experimentation didn't provide the values), are either left empty or are filled with values derived from the sample values according to some underlying model. Such tables and associated experimentation samples can be defined in various fields, like in biology, or in physics, or in demography sciences, or in consumer behaviour or stock exchange modeling. Referring to FIG. 3A, the table delimited by double line borders corresponds to a range of cells with two columns. The left column holds some values $\{x_i\}$ and the right column holds some values $y_i=f(x_i)$, with only the top, second, fifth, fifteenth and last cells containing values derived from measurements. All the other cells within the right column are left empty as no measurement information is available to fill them. The plot on the right side of the range shows in a graphical way the available samples. By using conventional means for filling the rightmost column of the table (such as the "Fill by example" tool available with the Lotus Corporation 1-2-3 spreadsheet), the spreadsheet user gets a result as depicted in FIG. 3B: the two first cells of the column are kept unchanged and the other ones are evaluated as a linear extrapolation of the two first cells. Doing so, the existing samples (fifth, fifteenth and last cells) are overwritten, that is lost. The plot on the right side of the table shows the poor result of the range filling operation done with these conventional means. This single example is just an illustration of the fact that the means available in conventional electronic spreadsheets, can only properly fill a range of cells if the following conditions are met:

The only available samples are the first two ones in the range of cells.

The underlying function should be close enough to either an arithmetic or geometric law.

The $\{x_i\}$ values, as introduced above, should be arranged as a geometric sequence.

Figure 3C:
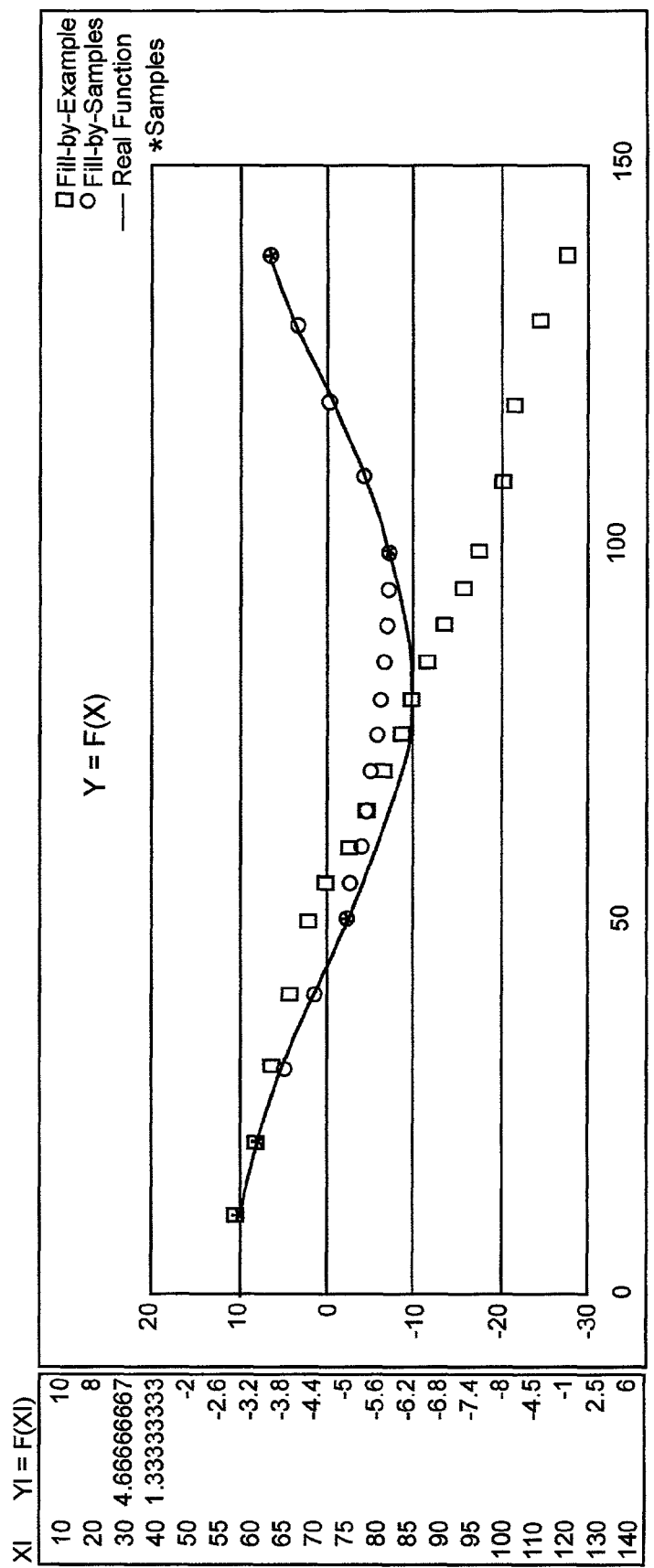
Figure 3D:
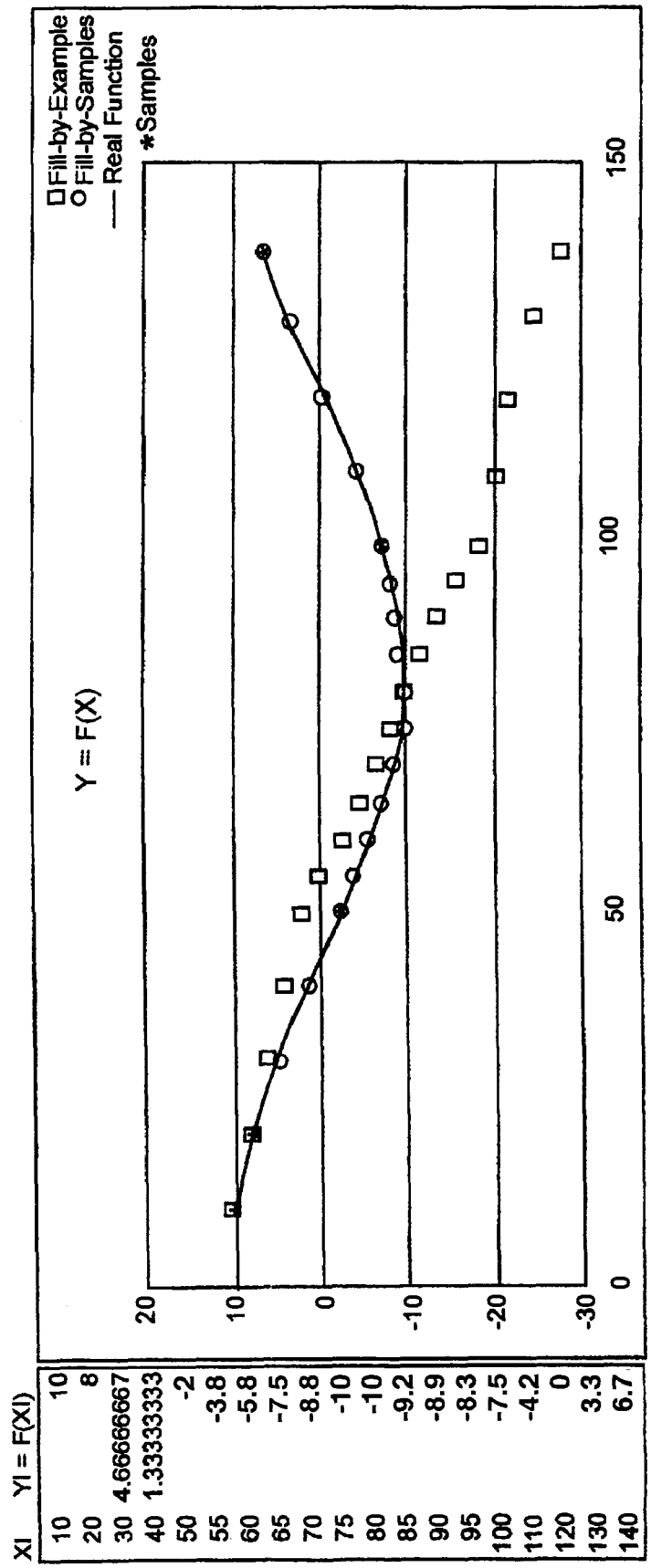

Such conditions are difficult to meet, so that the conventional range filling operational means raise more difficulties than they solve. The present invention offers a user-friendly solution to this problem by defining a method and system allowing to persistently fill a range of cells on the basis of some samples. With the same example as the one introduced above, the FIG. 3C shows how a preferred embodiment of the present invention fills the rightmost column of the range. The plot on the right side allows to compare the samples, the output of the conventional fill-by-example operation, the output of the fill-by-sample operation according to a preferred embodiment of the present invention, and the theoretical curve which was approximated by the samples. Furthermore the FIG. 3D shows how a preferred embodiment of the present invention reacts upon the introduction of a new sample. The conventional means such as the fill-by-example operation do not react to the introduction of a new sample; or to the modification of an existing sample or to the deletion of an existing sample. The present invention dynamically updates the filled values within the range of cells as soon as a sample value is either added, or changed, or deleted. In the example of FIG. 3D, a new sample (the middle cell in the table corresponding to x=75) is introduced: its measured value −10 supersedes the previous ones −5 in FIG. 3C which was obtained by the fill-by-sample operation. As a result, the values of the neighbour cells are updated to take into account the new sample.

B. Improved Range-Fill Manager

In contrast to just-described conventional tools, the present invention provides a more powerful, user-friendly and interactive approach for filling ranges of cells in a form of a Range-Fill Manager. The manager automatically allows the spreadsheet user to specify:

if a selected range of cells must be filled according to a "fill-by-sample" mode of operation, and if this filling operation must maintain or not persistent effect, that is automatically react upon future changes in the selected range.

For more clarity, the ranges of cells which take advantage of the present invention will be called "persistent sampled ranges of cells" or for short "PSROC".

C. Persistent Sampled Ranges of Cells sIn a preferred embodiment, PSROC can be easily identified on the display device 106 within the work area 180 of the window 160 by using some specific cell attributes, such as a font style or font color or background color or border line style or border line color or background pattern, etc . . . In a preferred embodiment, the background color of a PSROC is set to a value referred to as $PSROC_{13}$ COLOR. Furthermore to easily identify within a PSROC which cells contain samples and which cells contain values derived from sample, the sample cells are using a BOLD font whereas the other cells are using a normal font.

D. Scenario

In a preferred embodiment, the present invention can be used in two steps:

The first step occurs when the spreadsheet user decides, based on some criteria not developed here, whether a given range of cells deserves to take advantage of the improved range-fill manager or not. If it is the case, the spreadsheet user follows in sequence the following steps.

First the spreadsheet user selects the relevant range of cells by using conventional means such as (but not limited to) the pointing device 105 or the keyboard 104. Without loosing any generality nor departing from the spirit of the invention, it is assumed that the selected range of cells is either constituted by a single column range of cells or by a double column range of cells. In the former case, this i-th cell within this range of cells corresponds to $y_i=f(i)$.

In other words the range corresponds to the images of a function f of a list of equally spaced successive values:

f(1), f(2), f(3), . . . , f(N). In the later case, the i-th cell within the left column within the range of cells corresponds to a parameter $x_i$ and the i-th cell within the right column within the range of cells corresponds to $y_i=f(x_i)$. In other words, the right most column of the range corresponds to the images by a function f of a list of any values: $f(x_1), f(x_2), f(x_3), \ldots, f(x_N)$.

Figure 5A:
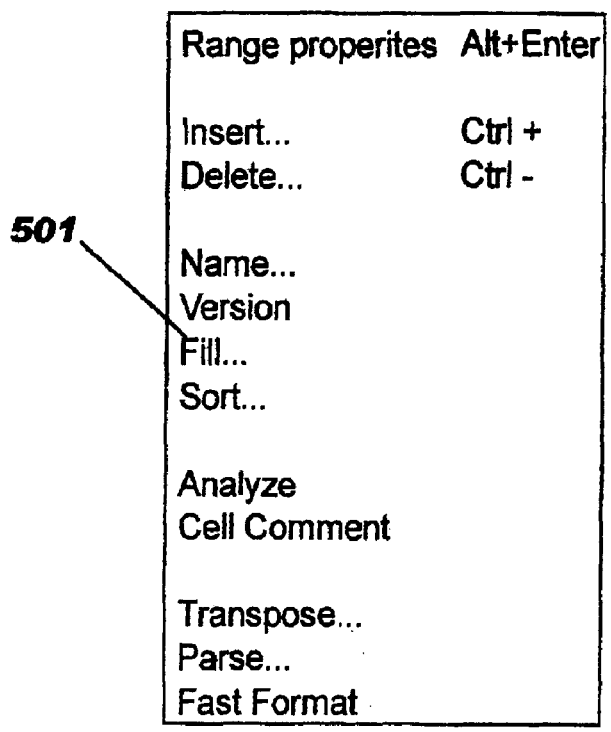
FIGS. 5A, 5B illustrate a preferred spreadsheet user interface for invoking the persistent fill-by-sample operation, according to the present invention.
Figure 5B:
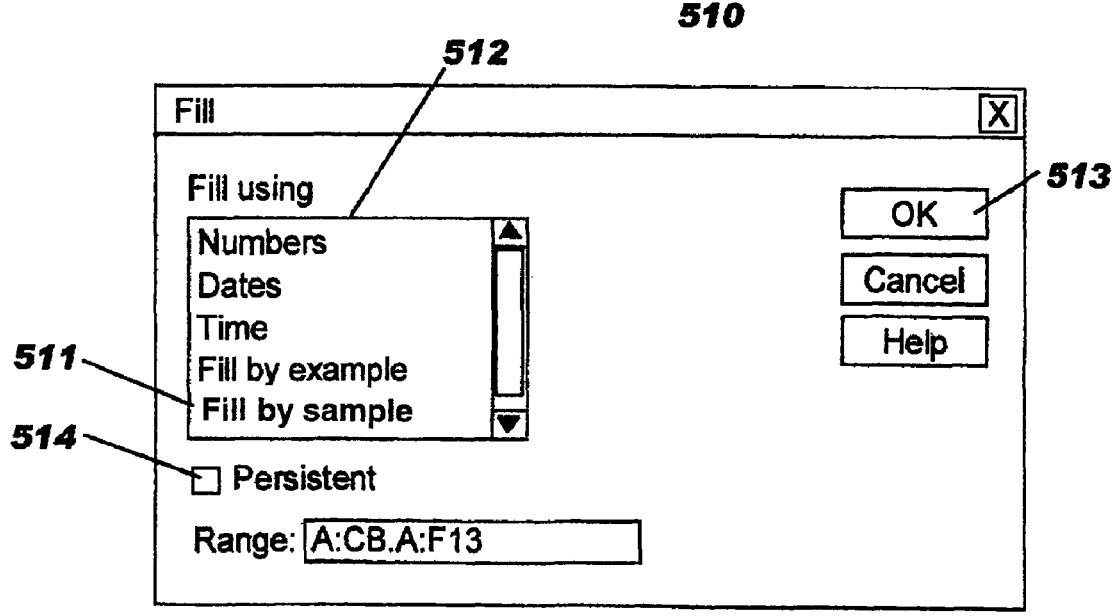

Then the spreadsheet user invokes an extension of the regular range fill operation thanks to conventional means available in spreadsheet environments, such as (but not limited to) dedicated push-buttons, keyboard entry short cuts, menu or sub menu entries. This extension of the regular range-fill operation corresponds to a specific command called "Fill-by-sample". In a preferred embodiment of the present invention, this Fill-by-sample command is invoked by clicking with the pointing device 105 first on a menu entry 501 "Fill" (FIG. 5A) within the conventional "Range"

menu 500 of an electronic spreadsheet, as shown in FIG. 5A, then on a specific field "Fill by Sample" 511 within a "Fill using" list box 512 present within a specific new dialog box "Fill" 510 as shown in FIG. 5B, and then on the "OK" push-button 513 available within this same dialog box 510. Optionally the spreadsheet user can click with the pointing device 105 on the "Persistent" check box 514 within the dialog box 510 to specify that the filling operation must keep a persistent effect. At completion of the Fill-by-sample command, the empty cells within the selected range of cells are automatically filled with values derived from the sample cells (the ones initially filled by the spreadsheet user). If the "Persistent" option is specified, then at completion of the Fill-by-sample command, the background color of the selected range of cells is set to the value PSROC_COLOR, reflecting that this range of cells is now a PSROC. If the "Persistent" option is not specified, and if the selected range was previously turned into a PSROC, then at completion of the Fill-by-sample command, the background color of the selected PSROC is reset to the initial value before it was turned into a PSROC.

The second step occurs when the spreadsheet user updates a cell belonging to a PSROC:

If the spreadsheet user empties the content of a cell belonging to the PSROC, whether this cell was previously hosting or not a sample value, then the improved range-fill manager invokes by itself a specific command called "Persistent_Fill-by-Sample" which automatically reflects this update in all the cells belonging to the PSROC, by considering that the emptied cell no longer contains a sample. This "Persistent_Fill-by-Sample" operation is fully automated, without involvement of the spreadsheet user, and is itself based on a Fill-by-sample operation applied by the improved range-fill manager onto the PSROC.

If the spreadsheet user enters the content of a cell belonging to a PSROC, whether this cell was previously hosting or not a sample value, then the improved range-fill manager invokes by itself a specific command called "Persistent_Fill-by-Sample" which automatically reflects this update in all the cells belonging to the PSROC, by considering that the specified cell contains either a new sample or a sample update. This "Persistent_Fill-by-Sample" operation is fully automated, without involvement of the spreadsheet user, and is itself based on a Fill-by-sample operation applied by the improved range-fill manager onto the PSROC.

E. Persistent Fill-by-sample Table

The decision to perform a persistent fill-by-sample operation on a given range of cells belongs to the spreadsheet user. When this operation occurs, a common repository, called the "Persistent Fill-by-sample Table" (PFBST for short), is used to record the data required by this operation. This Persistent Fill-by-sample Table is preferably saved in non-volatile memory (typically but not necessary as part of the spreadsheet disk file on the mass storage 107).

Referring now to FIG. 4, the Persistent Fill-by-sample Table 400 corresponds to a logical simple structure made of several records 401, each of them associated to a row of a PSROC, so that the Fill-by-sample table 400 has as many rows as the PSROC. Each record includes the following fields:

The "Index" field 402 is used for identifying uniquely the record 401. The "Index" field 402 of the top record 401 is always set to the value 1, and the "Index" field 402 of any other record 401 has a value equal to that of the "Index" field 402 of the previous record 401, incremented by 1. In the description of the following fields, it is assumed that the value taken by the "Index" field 402 is represented by the variable "i".

The "Sample" field 403 is used for identifying if the i-th cell in the rightmost column of the PSROC contains or not a sample. If it is the case, then the value taken by the "Sample" field 403 is equal to 1, otherwise to 0.

The "Xi" field 404 contains the value of the i-th variable $x_i$. In the case of a PSROC with two columns, the leftmost column contains the sequence of these $x_i$ variables, so that the "Xi" field 404 is equal to the value taken by the i-th cell of the leftmost column of the PSROC. When the PSROC only contains a single column, then $x_i$ defaults to the value i, so that the "Xi" field 404 is equal to the "Index" field 402.

The "Index of previous sample" field 405 contains the value of the "Index" field 402 of the same record 401 within the Persistent Fill-by-sample table 400 if this same record 401 contains a "Sample" field 403 set to the value 1. Otherwise the "Index of previous sample" field 405 contains the value of the "Index" field 402 of the first previous record 401 within the Persistent Fill-by-sample table 400 containing a "Sample" field 403 set to the value 1. If there is no previous record 401 containing a "Sample" field 403 set to the value 1, then the "Index of previous sample" field 405 defaults to the value 0. The "Xprev. sample" field 406 contains the value of the "Xi" field 404 of the same record 401 within the Persistent Fill-by-sample table 400 if this same record 401 contains a "Sample"field 403 set to the value 1. Otherwise the "Xprev. sample" field 406 contains the value of the "Xi" field 404 of the first previous record 401 within the Persistent Fill-by-sample table 400 containing a "Sample" field 403 set to the value 1. If there is no previous record 401 containing a "Sample" field 403 set to the value 1, then the "Xprev. sample" field 406 defaults to the value 0.

The "f(Xprev. sample)" field 407 contains the value of the i-th cell in the rightmost column of the PSROC, if the "Sample" field 403 within the same record 401 is set to the value 1. Otherwise the "f(Xprev. sample)" field 407 contains the value of the "f(Xprev. sample)" field 407 of the first previous record 401 within the Persistent Fill-by-sample table 400 containing a "Sample" field 403 set to the value 1. If there is no previous record 401 containing a "Sample" field 403 set to the value 1, then the "f(Xprev. sample)" field 407 defaults to the value 0.

The "Index of next sample" field 408 contains the value of the "Index" field 402 of the same record 401 within the Persistent Fill-by-sample table 400 if this same record 401 contains a "Sample" field 403 set to the value 1. Otherwise the "Index of next sample" field 408 contains the value of the "Index" field 402 of the first following record 401 within the Persistent Fill-by-sample table 400 containing a "Sample" field 403 set to the value 1. If there is no following record 401 containing a "Sample" field 403 set to the value 1, then the "Index of next sample" field 408 defaults to the value N+1, where N represents the number of rows in PSROC.

The "Xnext sample" field 409 contains the value of the "Xi" field 404 of the same record 401 within the Persistent Fill-by-sample table 400 if this same record 401 contains a "Sample" field 403 set to the value 1. Otherwise the "Xnext sample" field 409 contains the value of the "Xi" field 404 of the first following record 401 within the Persistent Fill-by-sample table 400 containing a "Sample" field 403 set to the value 1. If there is no following record 401 containing a "Sample" field 403 set to the value 1, then the "Xnext sample" field 409 defaults to the value 0.

The "f(Xnext sample)" field 410 contains the value of the i-th cell in the rightmost column of the PSROC, if the "Sample" field 403 within the same record 401 is set to the value 1. Otherwise the "f(Xnext sample)" field 410 contains the value of the "f(Xnext sample)" field 410 of the first following record 401 within the Persistent Fill-by-sample table 400 containing a "Sample" field 403 set to the value 1. If there is no following record 401 containing a "Sample" field 403 set to the value 1, then the "f(Xnext sample)" field 410 defaults to the value 0.

The "Color" field 411 contains the value of the background color attribute of the i-th cell in the rightmost column of the PSROC, before the corresponding range of cells is turned into a PSROC.

In the preferred embodiment, the Persistent Fill-by-sample Table 400 is explicitly included within the spreadsheet file itself, but other obvious implementations can be used instead.

F. Methods

F.1 Fill-by-sample Method

The method for filling by sample a given range of cells to take advantage of the present invention is summarised in flowchart 600 of FIGS. 6A and 6B, arranged according to FIG. 6. This method can be seen as the processing of the "Fill-by-sample" command. The method comprises the following steps:

At step 601, the method is in its default state, waiting for an event to initiate the process.

At step 602, an event is detected, as a result of a user action. This action can be for instance a specific combination of key on the keyboard 104, or the click of the pointing device 105 on a specific button, or any other similar means not further specified here.

At step 603, the address of the selected range and the option specifying if the operation must or not be persistent, both considered as parameters of the Fill-by-sample command, are retrieved under the respective names PSROC@ and persistent_option.

At step 604, the method checks if any Persistent Fill-by-sample Table 400 (PFBST) is already defined and associated to the same PSROC. This may have already happened as part of a previous execution of the same Fill-by-sample command. If such a PFBST 400 is already associated to the same PSROC, then control is given to step 606. Otherwise control is given to step 605.

At step 605, the method creates a new PFBST 400 associated to the PSROC identified by PSROC@. This new table contains as many rows as the PSROC and is initialized with empty records 401.

At step 606, the method initializes a local variable CurrIndex to the value 1.

At step 607, the current record 401 of the PFBST 400 is set equal to the value of CurrIndex, and the current row of the PSROC is also set equal to the value of CurrIndex.

At step 608, the "Index" field 402 of the current record 401 of the PFBST 400 is set equal to CurrIndex.

At step 609, the method checks if the rightmost cell within the current row of the PSROC is empty. If so, then control is given to step 610. Otherwise control is given to step 613.

At step 610, the method applies normal font to the rightmost cell within the current row of the PSROC.

At step 611, the "Sample" field 403 of the current record 401 of the PFBST 400 is set equal to 0. This value indicates that the corresponding row in the PSROC does not contain a sample.

At step 612, the rightmost cell within the current row of the PSROC is filled with a formula which formally translates how a value is extrapolated from sample values. In a preferred embodiment of the present invention, this formula takes the following form, using conventional spreadsheet formula language:

$$@if(X_{prev.}=X_{next}; (f(X_{prev.})+f(X_{next}))/2; f(X_{prev.})+(X_i-X_{prev.})*(f(X_{prev.})-f(X_{next}))/(X_{prev.}-X_{next}))$$

where $X_{prev.}$, $X_{next}$, $f(X_{prev.})$, $f(X_{next})$, and $X_i$ respectively correspond to the fields "Xprev. Sample" 406, "Xnext sample" 409, "f(Xprev. Sample)" 407, "f(Xnext sample)" 410, and "Xi" 404 within the same record 401. Then control is given to step 615.

At step 613, the method applies bold font to the rightmost cell within the current row of the PSROC.

At step 614, the "Sample" field 403 of the current record 401 of the PFBST 400 is set equal to 1. This value indicates that the corresponding row in the PSROC does contain a sample.

At step 615, the fields "Xi" 404, "Index of previous sample" 405, "Xprev. Sample" 406, "f(Xprev. Sample)" 407, "Index of next sample" field 408, "Xnext sample" 409, and "f(Xnext sample)" 410, all within the same record 401 of the PFBST 400 are filled with relevant formulas translating the above described relationships between these fields and the PSROC elements. In a preferred embodiment of the present invention, these formulas respectively take the following forms, using conventional spreadsheet formula language @IF(@COLS(PSROC)=2; left_of_PSROC; index), @IF(sample=1; index; prev_index$_{prev.}$), @IF(index$_{next}$=@ROWS(PSROC)+1; $X_i$; @IF (sample=1; $X_i$; prev_$X_{prev.}$)), @IF(sample=1; right_of_PSROC; prev_$f(X_{prev.})$), @IF(sample=1; index; next_index$_{next}$), @IF(index$_{prev.}$=0; $X_i$;@IF(sample=1; $X_i$; next_$X_{next}$)), @IF(sample=1; right_of_PSROC; next_$f(X_{next})$), where index, sample, index$_{prev.}$, index$_{next}$, and X$_i$ respectively correspond to the fields "Index" 402, "sample" 403, "index of previous sample" 405, "index of next sample" 408, and "Xi" 404 within the same record 401, where prev_index$_{prev.}$, prev_X$_{prev.}$ and prev_f(X$_{prev.}$)) respectively correspond to the fields "index of previous sample" 405, "Xprev. Sample" 406 and "f(Xprev. Sample)" 407 within the record 401 which precedes the current one, where next_index$_{next}$, next_X$_{next}$, and next_f(X$_{next}$) respectively correspond to the fields "index of next sample" 408, "Xnext Sample" 409 and "f(Xnext Sample)" 410 within the record 401 which follows the current one, and where left_of_PSROC and right_of_PSROC correspond to the leftmost and rightmost cells of the current row of the PSROC.

At step 616, the method checks if the "Color" field 411 of the current record 401 of the PFBST 400 is empty. If so, then control is given to step 617. Otherwise control is given to step 618.

At step 617, the "Color" field 411 of the current record 401 of the PFBST 400 is filled with the value of the background color of the rightmost cell of the current record of the PSROC.

At step 618, the local variable CurrIndex is incremented by 1.

At step 619, the method checks if the value of the local variable CurrIndex is equal or not to the number of rows of the PSROC. If so, then control is given to step 620. Otherwise control is given to step 607 for looping on the current record 401 of the PFBST 400.

At step 620, the method checks if the "Persistent_option" parameter is found equal to 1. If so, then control is given to step 621. Otherwise control is given to step 623.

At step 621, the background color of the entire rightmost column of the PSROC is changed to the PSROC_COLOR.

At step 622, the Persistent_Fill-by-sample command is set as the handling routine of the event corresponding to the content change of any cell within the rightmost column of the PSROC. This means that any future modification of the content of any cell within the rightmost column of the PSROC will trigger execution of the Persistent_Fill-by-sample command. Control is then given to the initial step 601 for handling any future invocation of the Fill-by-sample command.

At step 623, the original attributes of the cells within the rightmost column of the PSROC are restored. The value of the background color of the i-th cell can be found in the "Color" field 411 of the i-th record 401 of the PFBST 400, whereas the used font is set to normal, whether it was originally set to normal or not.

At step 624, the Persistent_Fill-by-sample command is disabled as the handling routine of the event corresponding to the content change of any cell within the rightmost column of the PSROC.

At step 625, the content of the rightmost column of the PSROC is copy-pasted by value onto itself so that the formula set at step 612 is replaced by the value it takes.

At step 626, the PFBST is deleted. Control is then given to the initial step 601 for handling any future invocation of the Fill-by-sample command.

F.2. Persistent_Fill-by-sample Method

The method for automatically reacting upon a PSROC right column content change to take advantage of the present invention is summarised in flowchart 700 of FIG. 7. This method can be seen as the processing of the "Persistent_Fill-by-sample" command. The method comprises the following steps:

At step 701, the method is in its default state, waiting for an event to initiate the process.

At step 702, an event is detected, triggering the command execution to start. This event is typically the change of the content of any cell within the rightmost column of the PSROC.

At step 703, the address of the cell whose content has changed, considered as a parameter of the Persistent_Fill-by-sample command, is retrieved under the name changed_cell@.

At step 704, the address of the PSROC containing the cell with address changed_cell@ is determined. This address is referred to as "PSROC@". As a given cell cannot belong to multiple PSROC, and as the invocation of the Persistent_Fill-by-sample command indirectly reflects that the changed cell belongs to a PSROC, there always exists a single PSROC containing the changed cell.

At step 705, the method checks if the cell with address changed_cell@ is empty. If it is the case, then it typically means that the spreadsheet user has cleared a previously existing sample; in this situation control is given to step 706. If the cell is not empty, then it typically means that the spreadsheet user has either modified the value of a previously existing sample, or a introduced a new sample; in this situation control is given to step 707.

At step 706, the font type of the cell with address changed_cell@ is set to bold. Control is then given to step 708.

At step 707, the font type of the cell with address changed_cell@ is set to normal.

At step 708, every cell within the rightmost column of the PSROC with address PSROC@ is cleared (content emptied) if and only if the font type of this cell is found equal to normal.

At step 709, the command Fill-by-sample is invoked, the passed arguments being respectively PSROC@ and 1 (for the persistent_option parameter). Then control is given to the initial step 701 for treating any future invocation of the command Persistent_Fill-by-sample command.

Alternate Embodiments

While the invention has been particularly shown and described with reference to a preferred embodiment, it will be understood that various changes in form and detail may be made therein without departing from the spirit, and scope of the invention.

The Persistent Fill-by-sample method and system according to the present invention may also be used advantageously in those environments where elements of information are organised as multi-dimensional tables having more than three dimensions.

The linear segment based interpolation method used in the preferred embodiment of the present invention may be replaced by other interpolation techniques ensuring that the underlying reference function y=f(x) crosses the sample points. Such techniques may rely on more than two neighbouring samples.

What is claimed:

1. A method for filling empty cells of a range of cells in a multi-dimensional spreadsheet comprising a plurality of cells identified by a cell address along each dimension of the spreadsheet, said method comprising the steps of:

selecting the range of cells, said range comprising a plurality of sample cells and one or a plurality of empty cells, wherein prior to said selecting each sample cell contains a sample value and an empty cell contains no value or a value not considered as a sample value; the content $y_i$ of each sample cell and each empty cell being associated with a particular value $x_i$ of a variable x;

after said selecting, ordering the sample cells and the empty cells according to the values $x_i$ associated with the content of said cells;

after said ordering, processing the empty cells comprising, for each empty cell, the steps of:
  identifying the value $x_i$ associated with the content of the empty cell;
  selecting one or a plurality of previous sample cells with respect to the empty cell;
  selecting one or a plurality of next sample cells with respect to the empty cell;
  computing the value $y_i$ of the empty cell according to the values $y_{previous}$ contained in the selected one or plurality of previous sample cells, and the values $y_{next}$ contained in the selected one or plurality of next sample cells;
  filling the empty cell with said computed value $y_i$; and
after said processing the empty cells, displaying the spreadsheet via a graphical user interface (GUI).

2. The method of claim 1, wherein said step of computing the value $y_i$ of each empty cell according to the values $y_{previous}$ contained in the selected one or plurality of previous sample cells, and the values $y_{next}$ contained in the selected one or plurality of next sample cells, comprises the further step of:
  computing the value $y_i$ of the empty cell according to the values $x_{previous}$ associated with the content $Y_{previous}$ of the selected one or plurality of previous sample cells, and the values $x_{next}$ associated with the content $y_{next}$ of the selected one or plurality of next sample cells.

3. The method of claim 1, wherein the selected range of cells further comprises variable cells, a variable cell containing a value $x_i$ associated with the content $y_i$ of a particular sample cell or a particular empty cell.

4. The method of claim 1, wherein the step of computing the value $y_i$ of an empty cell comprises the step of computing the value $y_i$ as equal to:

$$y_i = y_{previous} + (x_i - x_{previous}) * ((y_{next} - y_{previous}) / (x_{next} - x_{previous}))$$

where:
  $y_{previous}$ is the content of a previous cell containing a sample;
  $x_{previous}$ is the value of the variable x associated with the content of the previous cell containing a sample;
  $y_{next}$ is the content of a following cell containing a sample;
  $x_{next}$ is the value of the variable x associated with the content of a following cell containing a sample;
  $x_i$ is the value of the variable x associated with the empty cell.

5. The method of claim 1, wherein said selected range of cells comprises a double column or double row range of cells, said range of cells comprising 2N cells, wherein the i-th cell in a first column or first row comprises a value $x_i$ and the second column or second row comprises a value $y_i = f(x_i)$.

6. The method of claim 1, wherein the step of filling cells comprises the further step of: defining a table and associating said table with the selected range of cells, said table comprising for each empty cell i:
  an "index field" for identifying said empty cell;
  a "sample field" for indicating that said cell is an empty cell;
  a "$X_i$ field" with the value $x_i$ associated with said empty cell;
  an "index of previous sample field" with the value of the "index field" of a previous record having a sample value;
  a "Xprev. sample field" with the value of the "$X_i$ field" of a previous record having a sample value;
  a "f(Xprev. sample) field" with a value $y=f(x)$ of a cell in the range corresponding to a previous record having a sample value;
  an "index of next sample field" with a value of the "index field" of a next record having a sample value;
  a "Xnext sample field" with a value of the "$X_i$ field" of a next record having a sample value;
  a "f(Xnext sample) field" with a value $y=f(x)$ of a cell in the range corresponding to a next record having a sample value.

7. The method of claim 6, wherein said table further comprises for each sample cell i:
  an "index field" for identifying said sample cell;
  a "sample field" for indicating that said cell is a sample cell;
  a "$X_i$ field" with the value $x_i$ associated with said sample cell;
  the "index of previous sample field" with the value of the "index field" of said sample cell;
  a "Xprev. sample field" with the value of the "$X_i$ field" of said sample cell;
  the "f(Xprev. sample) field" with the value $y=f(x)$ of said sample cell;
  the "index of next sample field" with the value of the "index field" of said sample cell;
  the "Xnext sample field" with the value of the "$X_i$ field" of said sample cell;
  the "f(Xnext sample) field" with the value $y=f(x)$ of said sample cell.

8. The method of claim 7, wherein said table comprises N records, where N equals the number of rows in a single or double column range of cells or the number of columns in a single or double row range of cells.

9. The method of claim 1, further comprising: responsive to an occurrence of at least one event, automatically again performing said processing the empty cells, wherein the at least one event is selected from the group consisting of
  a change of one or a plurality of sample cells in the range,
  a change of one or a plurality of empty cells in the range,
  an addition of one or a plurality of sample cells in the range,
  an addition of one or a plurality of empty cells in the range,
  a deletion of one or a plurality of sample cells in the range,
  a deletion of one or a plurality of empty cells in the range,
  and combinations thereof.

10. The method of claim 9, wherein the at least one event comprises said change of one or a plurality of sample cells in the range.

11. The method of claim 9, wherein the at least one event comprises said change of one or a plurality of empty cells in the range.

12. The method of claim 9, wherein the at least one event comprises said addition of one or a plurality of sample cells in the range.

13. The method of claim 9, wherein the at least one event comprises said addition of one or a plurality of empty cells in the range.

14. The method of claim 9, wherein the at least one event comprises said deletion of one or a plurality of sample cells in the range.

15. The method of claim 9, wherein the at least one event comprises said deletion of one or a plurality of empty cells in the range.

16. The method of claim 1, further comprising designating the selected range of cells as a persistent sampled range of cells (PSROC).

17. The method of claim 16, wherein a background color of the selected range of cells is a first color before said designating the selected range of cells as a PSROC, and wherein after said designating the selected range of cells as a PSROC the method further comprises changing the background color of the selected range of cells to a second color that differs from the first color.

18. The method of claim 1, wherein for at least one empty cell of said empty cells:

said one or a plurality of previous sample cells consists of said plurality of previous sample cells, said one or a plurality of next sample cells consists of said plurality of next sample cells, or said one or a plurality of previous sample cells consists of said plurality of previous sample cells and said one or a plurality of next sample cells consists of said plurality of next sample cells.

19. A computer system comprising a processor and a memory coupled to the processor, said memory containing instructions that when executed by the processor implement the method of claim 1.

20. A computer program comprising instructions adapted for carrying out the method of claim 1 when said computer program is executed on a computer, said computer program comprising said instructions being stored on a memory device of a computer system.

* * * * *